(12) United States Patent
Du et al.

(10) Patent No.: US 11,568,269 B2
(45) Date of Patent: Jan. 31, 2023

(54) SCHEDULING METHOD AND RELATED APPARATUS

(71) Applicant: Cambricon Technologies Corporation Limited, Beijing (CN)

(72) Inventors: Zidong Du, Beijing (CN); Luyang Jin, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 302 days.

(21) Appl. No.: 16/767,415

(22) PCT Filed: Aug. 2, 2018

(86) PCT No.: PCT/CN2018/098324
§ 371 (c)(1),
(2) Date: May 27, 2020

(87) PCT Pub. No.: WO2019/128230
PCT Pub. Date: Jul. 4, 2019

(65) Prior Publication Data
US 2020/0387800 A1    Dec. 10, 2020

(30) Foreign Application Priority Data

Dec. 28, 2017 (CN) .......................... 201711467704.X
Dec. 28, 2017 (CN) .......................... 201711467705.4
(Continued)

(51) Int. Cl.
*G06F 9/455*     (2018.01)
*G06F 11/30*     (2006.01)
(Continued)

(52) U.S. Cl.
CPC ............. *G06N 3/10* (2013.01); *G06F 9/3889* (2013.01); *G06F 9/4881* (2013.01); *G06F 17/16* (2013.01); *G06N 3/08* (2013.01)

(58) Field of Classification Search
None
See application file for complete search history.

(56) References Cited

U.S. PATENT DOCUMENTS

2002/0199200 A1* 12/2002 Addington ............ G06F 9/5061
                                                                 725/97
2006/0120438 A1* 6/2006 Reial ................... H04B 1/7115
                                                               375/E1.032

(Continued)

FOREIGN PATENT DOCUMENTS

| CN | 102360309 A | 2/2012 |
| CN | 107018184 A | 8/2017 |

OTHER PUBLICATIONS

EP 18895350.9—Rules 70(2) and 70a(2) EPC, mailed Jul. 27, 2021, 1 page.
(Continued)

*Primary Examiner* — Hyun Nam
(74) *Attorney, Agent, or Firm* — Getech Law LLC; Jun Ye

(57) ABSTRACT

Disclosed are a scheduling method and a related apparatus. A computing apparatus in a server can be chosen to implement a computation request, thereby improving the running efficiency of the server.

14 Claims, 9 Drawing Sheets

(30) Foreign Application Priority Data

Dec. 28, 2017 (CN) .......................... 201711467741.0
Dec. 28, 2017 (CN) .......................... 201711467783.4

(51) Int. Cl.
    *G06N 3/10*     (2006.01)
    *G06F 9/38*     (2018.01)
    *G06F 9/48*     (2006.01)
    *G06F 17/16*     (2006.01)
    *G06N 3/08*     (2006.01)

(56) References Cited

U.S. PATENT DOCUMENTS

| | | | |
|---|---|---|---|
| 2009/0125370 A1* | 5/2009 | Blondeau | G06N 3/126 706/12 |
| 2009/0158285 A1* | 6/2009 | Lee | G06F 9/5011 718/102 |
| 2017/0003991 A1* | 1/2017 | Strandzhev | G06F 9/50 |
| 2022/0161129 A1* | 5/2022 | Lee | A63F 13/822 |
| 2022/0188709 A1* | 6/2022 | Petroulas | G06Q 50/12 |
| 2022/0224517 A1* | 7/2022 | Zhu | H04L 63/0823 |

OTHER PUBLICATIONS

EP 18895350.9—Extended European Search Report, dated Jul. 7, 2021, 8 pages.

* cited by examiner

SCHEDULING METHOD AND RELATED APPARATUS

CROSS-REFERENCE TO RELATED APPLICATION(S) INFORMATION

This application claims the benefit of and priority to International PCT Patent Application No. PCT/CN2018/098324, filed Aug. 2, 2018; which claims the benefit of and priority to Chinese Patent Application No. 201711467741.0, filed Dec. 28, 2017; both of which are incorporated herein by reference in their entirety.

TECHNICAL FIELD

The present disclosure relates to the field of computer technology, and particularly relates to a scheduling method and related apparatus.

BACKGROUND

At present, neural networks are the basis of many artificial intelligence applications. With further expansion of the application scope of neural networks, a variety of neural network models are stored by using servers or cloud computing services, and operations are performed according to operating requests submitted by users. Faced with numerous neural network models and large batches of requests, a technical problem of how to improve operating efficiency of servers is to be solved by those skilled in the art.

SUMMARY

Examples of the present disclosure provides a scheduling method and related apparatus. A computing device in a server can be selected to execute an operating request, which can improve operating efficiency of the server.

In a first aspect, examples of the present disclosure provide a scheduling method based on a server including multiple computing devices, where the method includes:
  receiving M operating requests;
  selecting at least one target computing device from the multiple computing devices according to attribute information of each of the M operating requests, and determining an operating instruction corresponding to each of the at least one target computing device, where the attribute information includes an operating task and a target neural network model;
  computing operating data corresponding to the M operating requests according to the operating instruction corresponding to each of the at least one target computing device to obtain M final operating results; and
  sending each of the M final operating results to a corresponding electronic device.

In a second aspect, examples of the present disclosure provide a server which includes multiple computing devices. The multiple computing devices include:
  a receiving unit configured to receive M operating requests;
  a scheduling unit configured to select at least one target computing device from the multiple computing devices according to attribute information of each of the M operating requests, and determine an operating instruction corresponding to each of the target computing devices, where the attribute information includes an operating task and a target neural network model;
  an operating unit configured to compute operating data corresponding to the M operating requests according to the operating instruction corresponding to each of the target computing devices to obtain M final operating results; and
  a sending unit configured to send each of the M final operating results to a corresponding electronic device.

According to a third aspect, examples of the present disclosure provide another server which includes a processor, a memory, a communication interface, and one or more programs. The one or more programs are stored in the memory and are configured to be executed by the processor. The one or more programs include instructions of some or all of the steps described in the first aspect.

According to a fourth aspect, examples of the present disclosure provide a computer readable storage medium, on which a computer program is stored. The computer program includes a program instruction. When executed by a processor, the program instruction enables the processor to execute the method of the first aspect.

In the scheduling method and related devices, a target computing device that executes M operating requests is selected from multiple computing devices included in the server based on the attribute information of the received M operating requests, and the corresponding operating instruction of target computing device is determined. The target computing device completes the operating request according to the corresponding operating instruction of the operating request, and sends the final operating result corresponding to each operating request to the corresponding electronic device. In other words, computing resources are uniformly allocated according to the operating request to make multiple computing devices in the server collaborate effectively, so as to increase operating efficiency of the server.

BRIEF DESCRIPTION OF THE DRAWINGS

To describe technical solutions in examples of the present disclosure more clearly, accompanied drawings needed in the examples of the present disclosure will be briefly described hereinafter. Apparently, the described accompanied drawings below are some examples of the present disclosure. Those of ordinary skill in the art may obtain other accompanied drawings based on the accompanied drawings without creative efforts.

DETAILED DESCRIPTION OF EXAMPLES

Technical solutions in the examples of the present disclosure will be described clearly and completely hereinafter with reference to the accompanied drawings in the examples of the present disclosure. Apparently, the described examples are merely some rather than all examples of the present disclosure. All other examples obtained by those of ordinary skill in the art based on the examples of the present disclosure without creative efforts shall fall within the protection scope of the present disclosure.

Examples of the present disclosure provide a scheduling method and related devices. A computing device in a server can be selected to execute an operating request, which can improve operating efficiency of the server. The present disclosure will be further described in detail below with reference to specific examples and the accompanied drawings.

Figure 1:
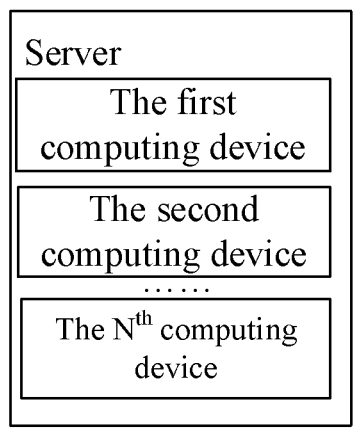
FIG. 1 is a structural diagram of a server according to an example of the present disclosure.

FIG. 1 is a structural diagram of a server according to one example of the present disclosure. As shown in FIG. 1, the server includes multiple computing devices. The multiple computing devices include, but are not limited to, a server computer, a personal computer (PC), a network PC, a small computer, a large computer, and the like.

In the present disclosure, each computing device included in the server establishes a connection and transfers data in a wired or wireless manner between each other, and each computing device includes at least one computing carrier, such as: a central processing unit (CPU), a graphics processing unit (GPU), a processor board card, and the like. In addition, the server involved in the present disclosure may also be a cloud server, which provides cloud computing services for electronic devices.

Figure 1A:
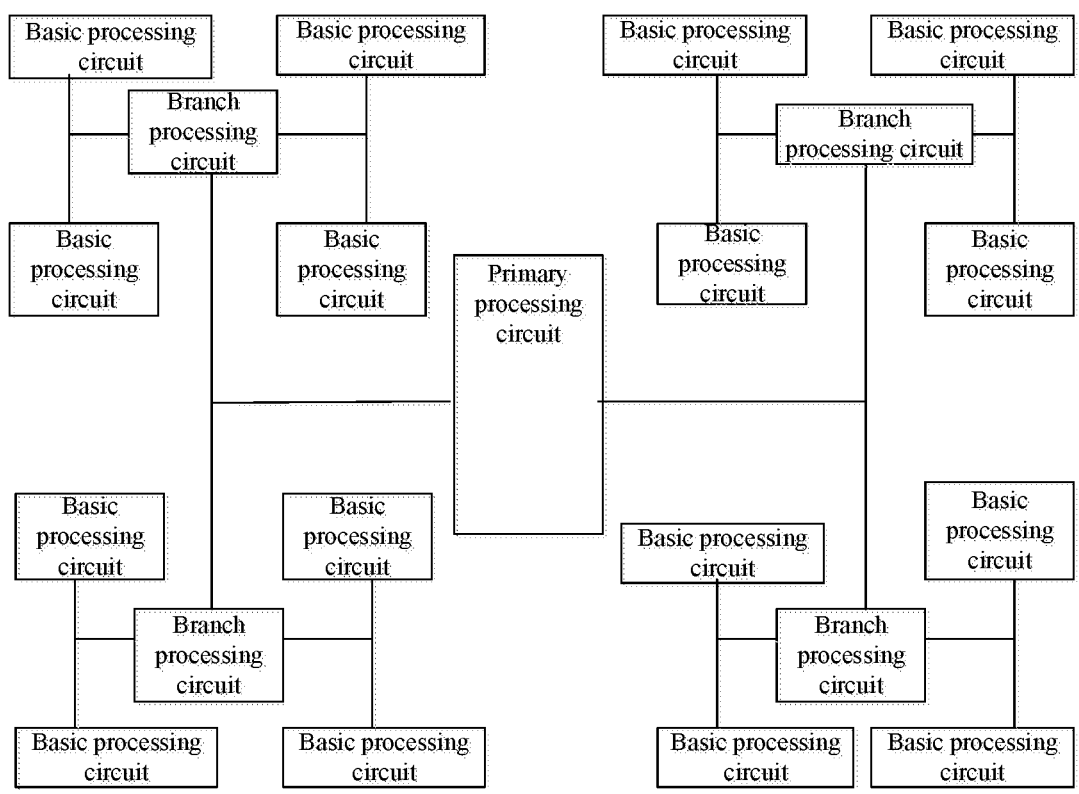
FIG. 1a is a structural diagram of a computing unit according to one example of the present disclosure.

Each computing carrier may include at least one computing unit used for performing a neural network operation, such as a processing chip. A specific structure of the computing unit is not limited herein. FIG. 1*a* is a structural diagram of a computing unit. As shown in FIG. 1*a*, the computing unit includes: a primary processing circuit, a basic processing circuit, and a branch processing circuit. Specifically, the primary processing circuit is connected to the branch processing circuit, and the branch processing circuit is connected to at least one basic processing circuit.

The branch processing circuit is configured to transfer and receive data from the primary processing circuit or the basic processing circuit.

Figure 1B:
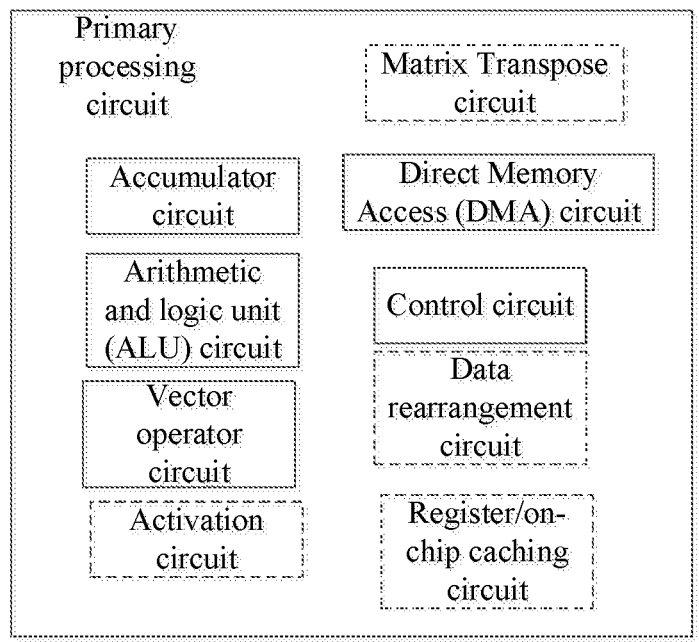
FIG. 1b is a structural diagram of a primary processing circuit according to one example of the present disclosure.

FIG. 1*b* is a structural diagram of the primary processing circuit. As shown in FIG. 1*b*, the primary processing circuit includes a register and/or an on-chip cache circuit. The primary processing circuit may further include a control circuit, a vector operator circuit, an arithmetic and logic unit (ALU) circuit, an accumulator circuit, a Direct Memory Access (DMA) circuit, and the like. In practical applications, the primary processing circuit may further include a conversion circuit (such as a matrix transpose circuit), a data rearrangement circuit, an activation circuit, or the like.

The primary processing circuit may also include a data transferring circuit, a data receiving circuit, or an interface. The data transferring circuit may integrate a data distribution circuit and a data broadcasting circuit. In practical applications, the data distribution circuit and the data broadcasting circuit may also be set separately; and the data transferring circuit and the data receiving circuit may also be integrated together to form a data transceiving circuit. Broadcast data refers to the data that needs to be transferred to each basic processing circuit. Distribution data refers to the data that needs to be selectively transferred to part of basic processing circuits. The specific selection method may be determined by the primary processing circuit according to the loads and a computing method. The method of broadcasting transfer refers to transmitting the broadcast data to each basic processing circuit in the form of broadcasting. (In practical applications, the broadcast data may be transferred to each basic processing circuit by one broadcast or multiple broadcasts. The number of the broadcasts is not limited in the specific implementation of the disclosure). The method of distribution transfer refers to selectively transferring the distribution data to part of basic processing circuits.

The control circuit of the primary processing circuit transfers data to part or all of the basic processing circuits when distributing data (where the data may be identical or different). Specifically, if data are transferred by means of distribution, the data received by each basic processing circuit may be different, alternatively, part of the basic processing circuits may receive the same data.

Specifically, when broadcasting data, the control circuit of the primary processing circuit transmits data to part or all of basic processing circuits, and each basic processing circuit may receive the same data.

In other words, the broadcast data may include all the data that needs to be received by the basic processing circuits. The distribution data may include: part of the data that needs to be received by the basic processing circuits. The primary processing circuit may send the broadcast data to all branch processing circuits through one or more broadcasts, and the branch processing circuit forwards the broadcast data to all basic processing circuits.

Optionally, the vector operator circuit of the primary processing circuit may perform vector operations, including but not limited to: addition, subtraction, multiplication, and division of two vectors, addition, subtraction, multiplication, and division of vectors and constants, or arbitrary operations on each element of the vector. The continuous operations may specifically be addition, subtraction, multiplication, and division of vectors and constants, an activation operation, an accumulation operation, and the like.

Each basic processing circuit may include a basic register and/or a basic on-chip cache circuit; each basic processing circuit may further include one or any combination of an inner product operator circuit, a vector operator circuit, an accumulator circuit, and the like. The inner product operator circuit, the vector operator circuit, and the accumulator circuit may all be integrated circuits. The inner product operator circuit, the vector operator circuit, and the accumulator circuit may also be circuits which are set separately.

A connection structure between the branch processing circuit and the basic circuit may be arbitrary, and is not limited to an H-shaped structure in FIG. 1*b*. Optionally, a structure from the primary processing circuit to the basic circuit is a broadcasting or distribution structure. A structure from the basic circuit to the primary processing circuit is a gather structure. Broadcasting, distribution, and gather are defined as follows.

A mode of data transfer from the primary processing circuit to the basic circuit may include:

the primary processing circuit is respectively connected to multiple branch processing circuits, and each branch processing circuit is respectively connected to multiple basic circuits;

the primary processing circuit is connected to a branch processing circuit, and the branch processing circuit is further connected to another branch processing circuit, and so on. Multiple branch processing circuits are connected in series, and then each branch processing circuit is respectively connected to multiple basic circuits;

the primary processing circuit is respectively connected to multiple branch processing circuits, and each branch processing circuit is further connected in series with multiple basic circuits; and the primary processing circuit is connected to a branch processing circuit, and the branch processing circuit is further connected to a branch processing circuit, and so on. Multiple branch processing circuits are connected in series, and then each branch processing circuit is connected in series to multiple basic circuits.

When distributing data, the primary processing circuit transfers data to some or all of the basic circuits, and the data received by each basic circuit that receives data may be different;

When broadcasting data, the primary processing circuit transfers data to some or all of the basic circuits, and each basic circuit that receives data receives the same data.

When gathering data, some or all of the basic circuits transfer data to the primary processing circuit. It should be noted that the computing unit shown in FIG. 1a may be a separate physical chip. In practical applications, the computing unit may also be integrated in other chips (such as a CPU and a GPU). A physical expression of the chip device is not limited herein.

Figure 1C:
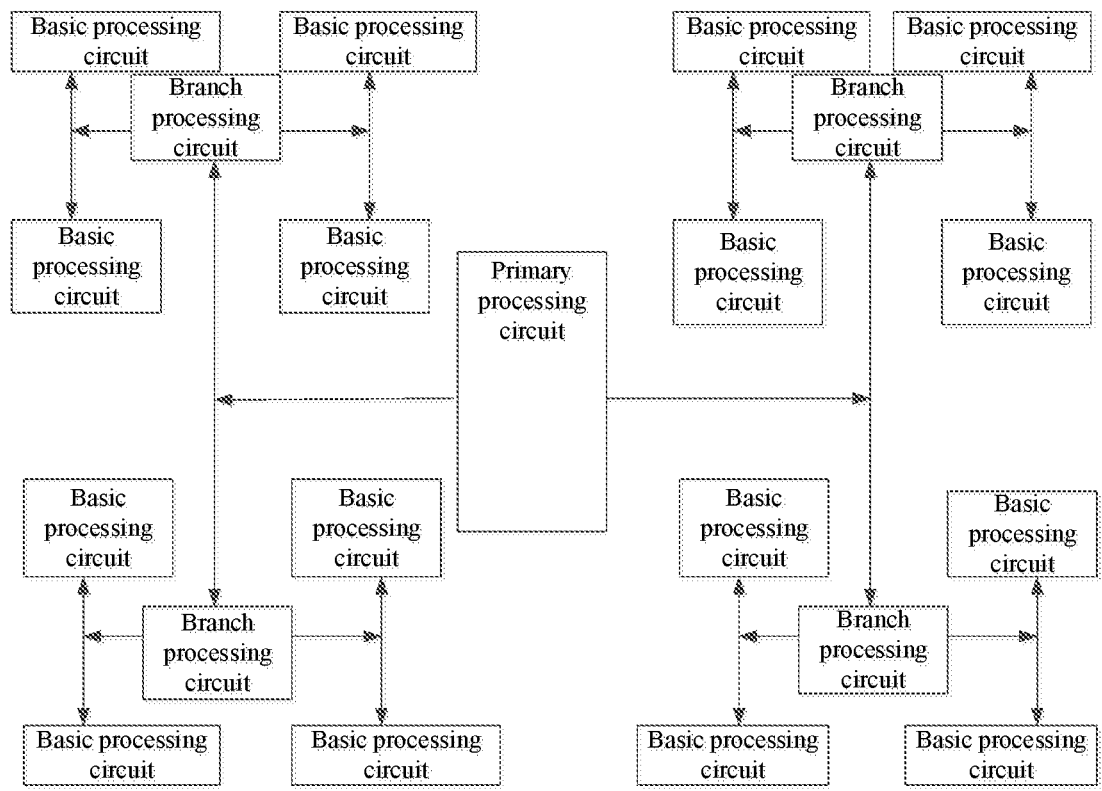
FIG. 1c is a schematic diagram of data distribution of a computing unit according to one example of the present disclosure.

FIG. 1c is a schematic diagram of data distribution of a computing unit. As shown by an arrow in FIG. 1c, the arrow refers to a direction of data distribution. As shown in FIG. 1c, after the primary processing circuit receives external data, the primary processing circuit split and distribute the external data to multiple branch processing circuits, and the multiple branch processing circuits transfer the split data to the basic processing circuit.

Figure 1D:
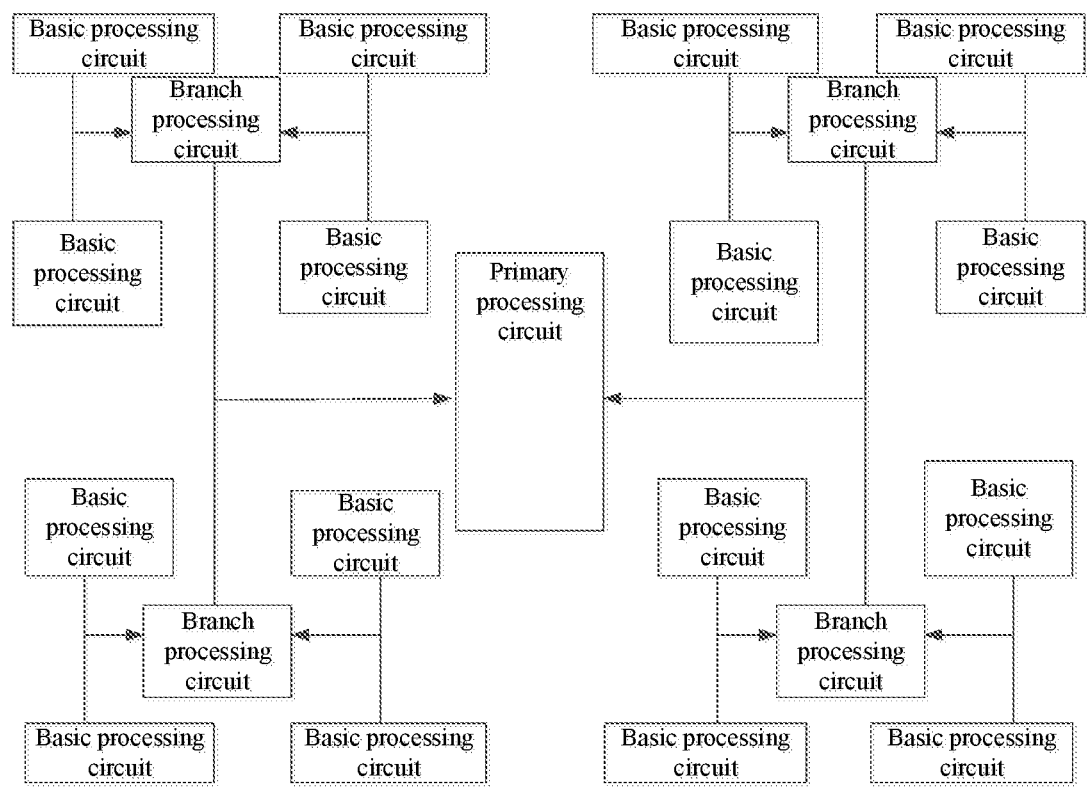
FIG. 1d is a schematic diagram of data return of a computing unit according to one example of the present disclosure.

FIG. 1d is a schematic diagram of data return of a computing unit. As shown by an arrow in FIG. 1d, the arrow refers to a direction of data return. As shown in FIG. 1d, the basic processing circuit returns data (such as an inner product computing result) to the branch processing circuit. The branch processing circuit then returns the data to the primary processing circuit.

Input data may specifically be a vector, a matrix, a multi-dimensional (three-dimensional or four-dimensional or above) data. A specific value of the input data may be viewed as an element of the input data.

Examples of the present disclosure also provide a computing method of a computing unit shown in FIG. 1a. The computing method is applied to a neural network operation. Specifically, the computing unit may be configured to perform an operation on input data and weight data of one or more layers in a multi-layer neural network.

Specifically, the computing unit is configured to perform an operation on one or more layers of input data and weight data in a trained multi-layer neural network; or the computing unit is configured to perform an operation on input data and weight data of one or more layers in a multi-layer neural network for forward operation.

The operations may include, but are not limited to, one or any combination of a convolution operation, a matrix multiplication matrix operation, a matrix multiplication vector operation, a bias operation, a fully connected operation, a GEMM operation, a GEMV operation, and an activation operation.

The GEMM operation refers to a matrix-matrix multiplication operation in the BLAS library. A general representation of this operation is: C=alpha*op (S)*op (P)+beta*C, where S and P refer to two input matrices, C refers to an output matrix, alpha and beta refer to scalars, and op represents a certain operation performed on the matrix S or P. In addition, auxiliary integers may be used as parameters to explain width and height of the matrix S and P.

The GEMV operation refers to a matrix-vector multiplication operation in the BLAS library. The general representation of this operation is: C=alpha*op (S)*P+beta*C, where S refers to an input matrix, P refers to an input vector, C refers to an output vector, alpha and beta refer to scalars, and op refers to a certain operation performed on the matrix S.

A connection relationship between the computing carriers in the computing device is not limited herein. The computing carriers may be homogeneous or heterogeneous computing carriers. A connection relationship between the computing units in the computing carrier is not limited herein. Parallel tasks can be executed by using the heterogeneous computing carrier or the computing unit, which may improve computing efficiency.

The computing device shown in FIG. 1 includes at least one computing carrier, and the computing carrier further includes at least one computing unit. In other words, a target computing device selected in the present disclosure deploys computing carriers of the same type on the same computing device based on the connection relationship between the computing devices, a specific physical hardware support such as a neural network model and network resources deployed on each computing device, and attribute information of an operating request. For instance, the computing carriers used for forward propagation are deployed on the same computing device rather than different computing devices, which can effectively reduce communication overhead between computing devices and improve operating efficiency. A specific neural network model can also be deployed on a specific computing carrier. In other words, when an operating request for a specified neural network is received by a server, the server can call a computing carrier corresponding to the specified neural network to execute the operating request, which can save time for determining a processing task and improve operating efficiency.

In the present disclosure, disclosed and widely used neural network models are used as specified neural network models, such as LeNet, AlexNet, ZFnet, GoogleNet, VGG, ResNet, and the like in a convolutional neural network (CNN).

Optionally, multiple operating requests and multiple hardware attributes may be obtained by obtaining n operating request of each specified neural network model in a set of specified neural network models and a hardware attribute of each computing device in the multiple computing devices. A corresponding specified neural network model may be deployed on a specified computing device corresponding to each neural network model in the set of specified neural network models according to the multiple operating requests and the multiple hardware attributes.

The set of specified neural network models includes multiple specified neural network models. The hardware attribute of the computing device may include a network bandwidth, a storage capacity, and a processor principal frequency of the computing device, and may also include a hardware attribute of the computing carrier or the computing unit in the computing device. In other words, if a computing device corresponding to the operating request of a specified neural network model is selected according to the hardware attribute of each computing device, a server failure caused by improper processing may be avoided and a computing support capability of the server may be improved.

An input neuron and an output neuron in the present disclosure do not refer to a neuron in an input layer and an output layer of the entire neural network, but refer to any two adjacent layers in the network, then the neuron in a lower layer of the network forward operation is the input neuron and the neuron in an upper layer of the network forward operation is the output neuron. Taking a convolutional neural network as an example, given that a convolutional neural network has L layers, and K=1, 2, . . . , L−1, a $K^{th}$ layer is named as an input layer and the neuron in this layer is the input neuron. A $K+1^{th}$ layer is named as an output layer and the neuron in this layer is the output neuron. In other words, except a top layer, each layer can be used as an input layer, and the next layer is the corresponding output layer.

Figure 1E:
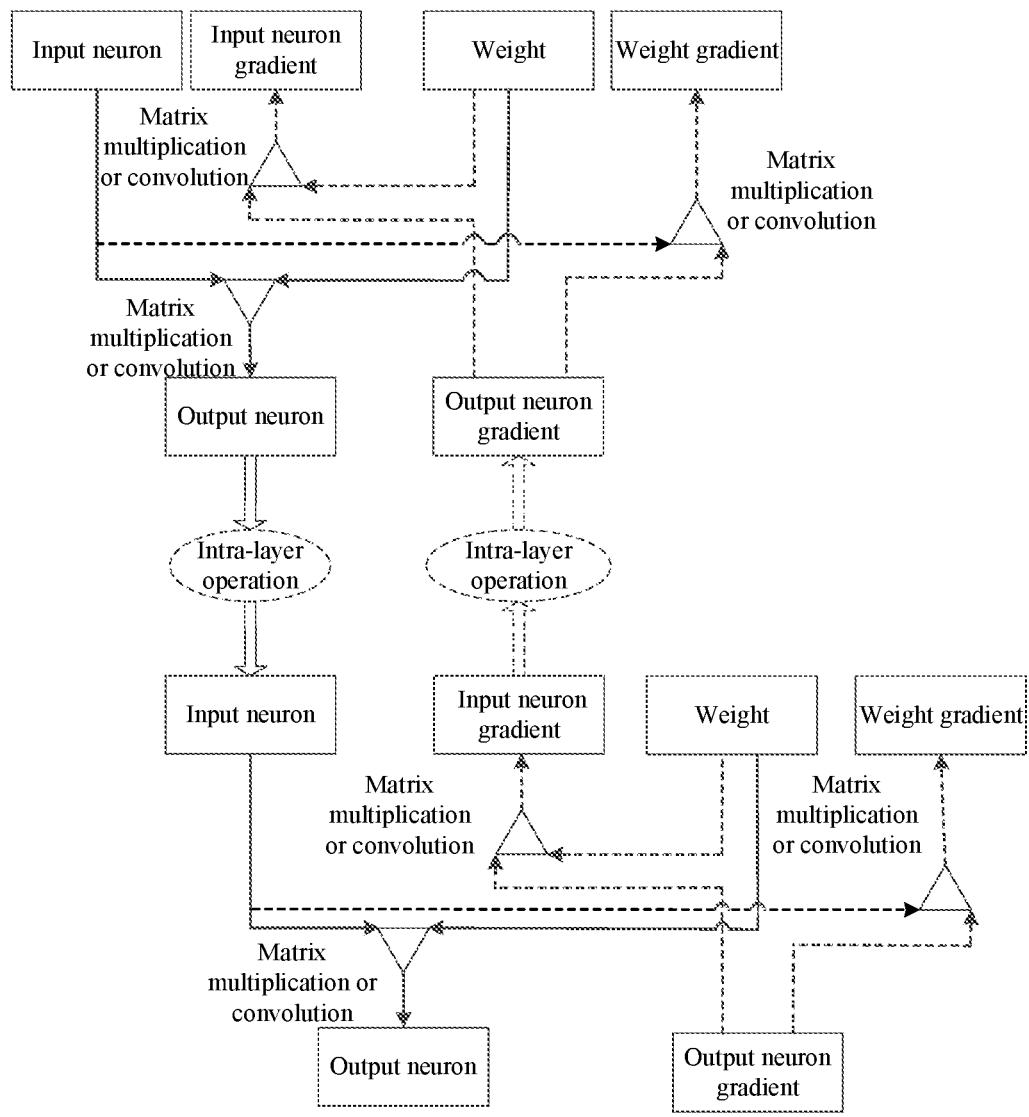
FIG. 1e is a schematic diagram of a neural network structure operation according to one example of the present disclosure.

The above operation may be an operation of one layer of a neural network. For a multi-layer neural network, the operation may be performed as shown in FIG. 1e. In FIG. 1e, the dashed arrow indicates a reverse operation, and the solid arrow indicates a forward operation. In the forward operation, if the forward operation of a previous layer artificial neural network is completed, operating instructions of a next layer will operate the output neuron processed in the operating unit as the input neuron of the next layer (or perform some operations on the output neuron, and then the output neuron is operated as the input neuron of the next layer). At the same time, the weight is also replaced by the weight of the next layer. In the reverse operation, if the reverse operation of a previous artificial neural network is completed, operating instructions of a next layer will operate an input neuron gradient processed in the operating unit as an output neuron gradient of the next layer (or perform some operations on the input neuron gradient, and then the input neuron gradient is operated as the output neuron gradient of the next layer). At the same time, the weight is replaced by the weight of the next layer.

The forward operation of a neural network is a process from inputting data to outputting data. A propagating direction of the reverse operation is opposite to that of the forward operation, and is a process of performing the forward operation reversely on loss between final output data and expected output data or a loss function corresponding to the loss between final output data and expected output data. A process of neural network learning and training may also be repeating the forward operation and the reverse operation of information, correcting the weights of each layer in a manner of the loss or the loss function gradient descent, and adjusting the weights of each layer, which may reduce the loss of network output.

Figure 2:
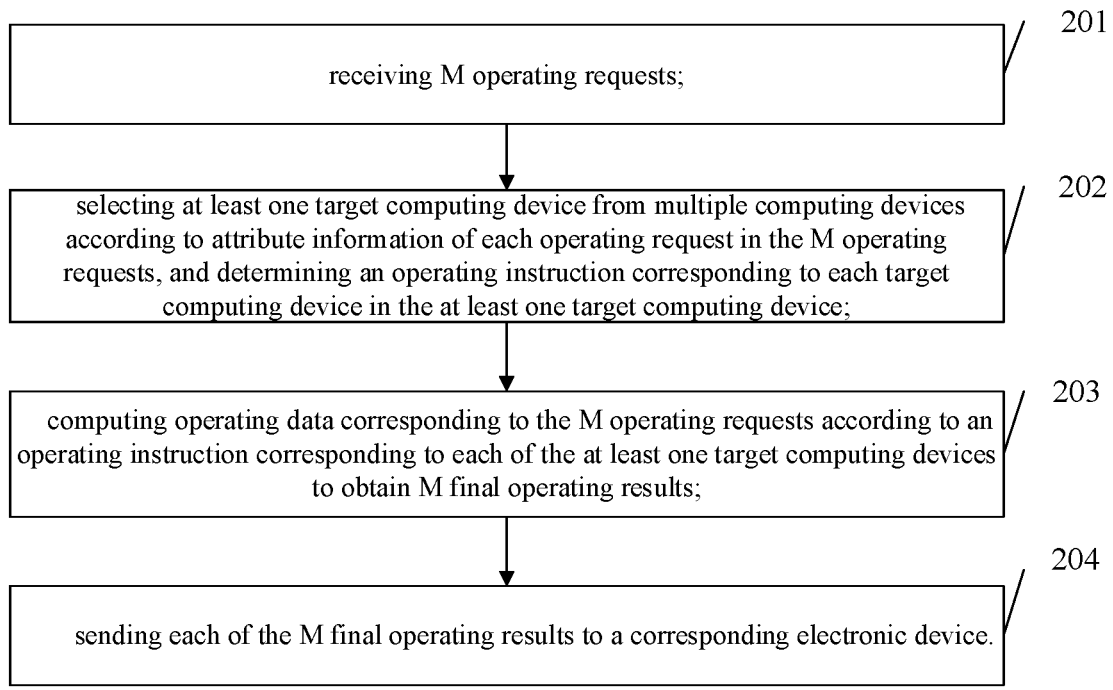
FIG. 2 is a flow chart of a scheduling method of another example of the present disclosure.

FIG. 2 is a flow chart of a scheduling method of one example of the present disclosure. As shown in FIG. 2, the method is applied to the server shown in FIG. 1, and an electronic device that is allowed to access to the server is involved in the method. The electronic device may include various handheld devices, vehicle-mounted devices, wearable devices, and computing devices with a function of wireless communication, or other processing devices connected to a wireless modem, and various forms of user equipment (UE), mobile stations (MS), terminal devices, and the like.

A step 201 includes: receiving M operating requests.

In the present disclosure, M is a positive integer, and a server receives M operating requests sent by the electronic device that is allowed to access the server. The number of electronic devices and the number of operating requests sent by each electronic device are not limited herein. In other words, the M operating requests may be sent by one electronic device, or be sent by multiple electronic devices.

The operating request includes attribute information such as an operating task (a training task or a test task) and a target neural network model involved in the operation. The training task refers to training the target neural network model. In other words, the neural network model is subjected to forward and reverse operations until the training is completed. The test task refers to performing one forward operation according to the target neural network model.

The target neural network model may be a neural network model uploaded when users send an operating request through an electronic device, or may be a neural network model stored in a server, etc. The number of target neural network models is not limited herein. In other words, each operating request may correspond to at least one target neural network model.

A step 202 may includes: selecting at least one target computing device from multiple computing devices according to attribute information of each operating request in the M operating requests, and determining an operating instruction corresponding to each target computing device in the at least one target computing device.

A method of selecting a target computing device is not limited herein, and may be selected according to the number of operating requests and the number of target neural network models. For instance, if there is an operating request and the operating request corresponds to a target neural network model, corresponding operating instructions of the operating request are classified to obtain parallel instructions and serial instructions. The parallel instructions are allocated to different target computing devices for operation, and the serial instructions are allocated to the target computing device that is expert in processing for operation, so as to improve the operating efficiency of each instruction, which can improve the overall operating efficiency. If there are multiple operating requests and the multiple operating requests correspond to a target neural network model, the target computing device including the target neural network model may be configured to perform batch processing on operating data corresponding to the multiple operating requests to avoid waste of time due to repeated operations and avoid extra overhead caused by communication between different computing devices, which can improve the operating efficiency. If there are multiple operating requests and multiple operating requests correspond to multiple target neural network models, a computing device that is expert in processing the target neural network model or a computing device deployed with the target neural network model can be looked up to complete the operating request, which can save time in network initialization and improve the operating efficiency.

Optionally, if an operating task of a target operating request is a test task, a computing device configured to perform the forward operation on a target neural network model corresponding to the target operating task is selected from the multiple computing devices to obtain a first target computing device. If the operating task of the target operating request is a training task, a computing device configured to perform the forward operation and reverse training on a target neural network model corresponding to the target operating task is selected from the multiple computing devices to obtain the first target computing device, and an operating instruction corresponding to the first target computing device is determined to complete the target operating request.

The target operating request is any operating request of the M operating requests, and the first target computing device is a target computing device corresponding to the target operating request in the at least one target computing devices.

In other words, if the operating task of the target operating request is a test task, the first target computing device is a computing device configured to perform the forward operation on the target neural network model. If the operating task is a training task, the first target computing device is a computing device configured to perform the forward operation and reverse training on the target neural network model, which can be viewed as processing the operating request by using a specified computing device to improve accuracy and efficiency of operations.

For instance, the server includes a first computing device and a second computing device. The first computing device is only configured to perform the forward operation on a specified neural network model, and the second computing device may be configured to perform both the forward operation and the reverse training on the specified neural network model. When the target neural network model in the received target operating request is the specified neural network model and the operating task is a test task, the first computing device is determined to execute the target operating request.

A step 203 includes: computing operating data corresponding to the M operating requests according to an operating instruction corresponding to each of the at least one target computing devices to obtain M final operating results.

The operating data corresponding to each operating request is not limited herein, which may be image data used for image recognition or voice data used for voice recognition. When the operating task is a test task, the operating data refers to data uploaded by users. When the operating task is a training task, the operating data may be a training set uploaded by users, or a training set which corresponds to the target neural network model and is stored in the server.

In the present disclosure, multiple intermediate operating results may be generated during the computation of the operating instruction, and the final operating result corresponding to each operating request may be obtained according to the multiple intermediate operating results.

A step 204 includes: sending each of the M final operating results to a corresponding electronic device.

It can be understood that, based on attribute information of the received operating request, a target computing device configured to execute M operating requests is selected from the M computing devices included in the server, and an operating instruction corresponding to the target computing device is determined. The target computing device completes the operating request according to a corresponding operating instruction of the target computing device, and sends the final operating result corresponding to each operating request to the corresponding electronic device. In other words, computing resources are uniformly allocated according to the operating request, so that multiple computing devices in the server can effectively cooperate to improve the operating efficiency of the server.

Optionally, the method may further include: waiting for a first preset time period, and detecting whether each of the at least one target computing device returns a final operating result of a corresponding operating instruction, where if each of the at least one target computing device does not return a final operating result of a corresponding operating instruction, the target computing device that does not return the final operating result is viewed as a delay computing device; selecting an alternative computing device from idle computing devices of the multiple computing devices according to a corresponding operating instruction of the delay computing device; and executing the corresponding operating instruction of the delay computing device by using the alternative computing device.

In other words, when the first preset time period is reached, a computing device which does not complete execution of the operating instruction is viewed as a delay computing device, and an alternative computing device is selected from idle computing devices according to the operating instruction executed by the delay computing device, so as to improve operating efficiency.

Optionally, after the operating instruction corresponding to the delay computing device is executed by the alternative computing device, the method may further include: obtaining a final operating result returned first between the delay computing device and the alternative computing device; and sending a pause instruction to a computing device that does not return a final computing result between the delay computing device and the alternative computing device.

The pause instruction is configured to instruct a computing device that does not return a final computing result between the delay computing device and the alternative computing device to suspend execution of the corresponding operating instruction. In other words, the operating instruction corresponding to the delay computing device is executed by using the alternative computing device, and the computing result returned first between the alternative computing device and the delay computing device is selected to be a final operating result corresponding to the operating instruction. Then the pause instruction is sent to the computing device that does not return the final operating result between the delay computing device and the alternative computing device, and the operation of the computing device that does not complete the operating instruction is suspended, which can save power consumption.

Optionally, the method may further include: waiting for a second preset time period, detecting whether the delay computing device returns a final operating result of a corresponding operating instruction. If the delay computing device does not return a final operating result of a corresponding operating instruction, the delay computing device that does not return a final operating result is viewed as a fault computing device, and a fault instruction is sent.

The fault instruction is configured to inform an operations engineer that a fault occurs in the fault computing device, and the second preset time period is greater than the first preset time period. In other words, when the second preset time period is reached, if the final computing result returned by the delay computing device is not received, a fault is determined to occur in the delay computing device and a corresponding operations engineer is informed, so as to improve the capability of processing faults.

Optionally, the method may further include: updating hash tables of the multiple computing devices every target time threshold.

A hash table is a data structure that is directly accessed according to a key value. In the present disclosure, IP addresses of multiple computing devices are used as key values, and are mapped to a position in the hash table by using a hash function (mapping function). In other words, after a target computing device is determined, physical resources allocated by the target computing device can be quickly found. A specific form of the hash table is not limited herein, which may be a static hash table that is set artificially, or a hardware resource allocated according to an IP address. The hash tables of multiple computing devices are updated every target time threshold, which can improve accuracy and efficiency of searching.

Figure 3:
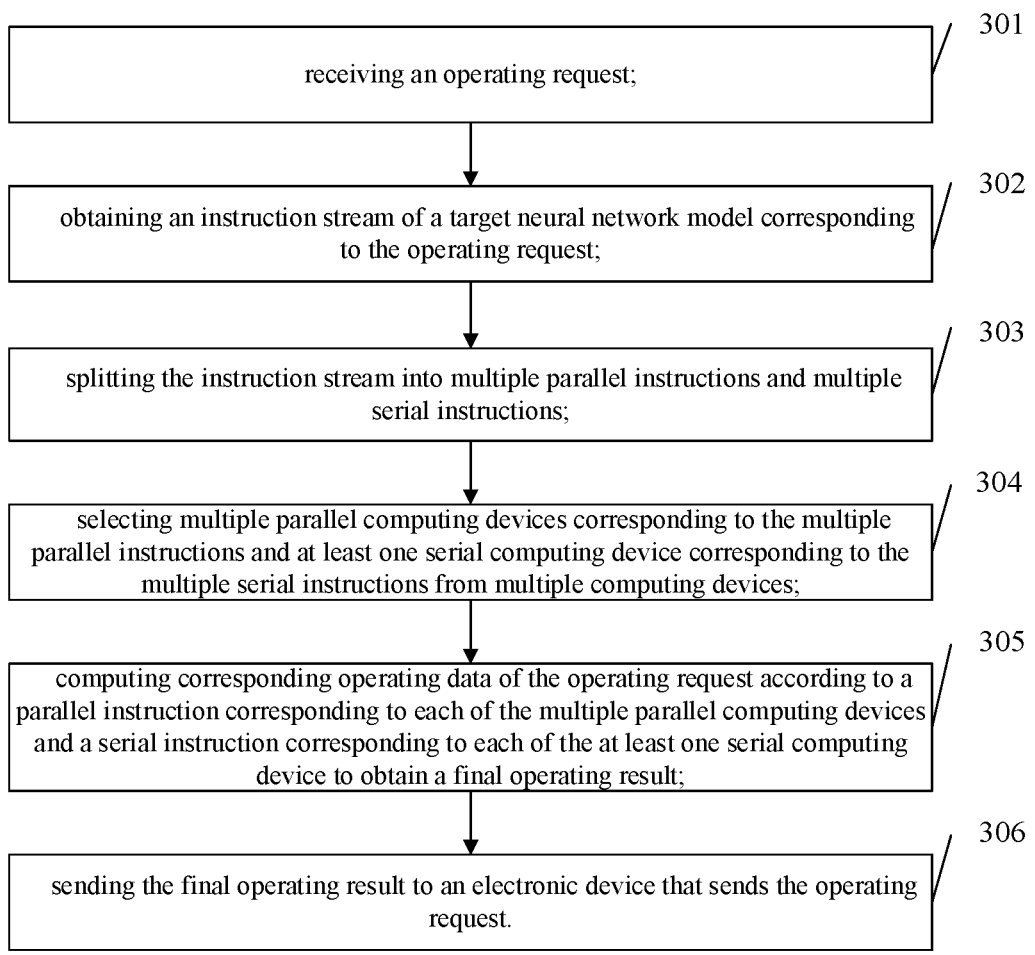
FIG. 3 is a flow chart of another scheduling method of one example of the present disclosure.

FIG. 3 is a flow chart of another scheduling method of one example of the present disclosure. As shown in FIG. 3, the method is applied to the server shown in FIG. 1, and an electronic device that allows access to the server is involved in the method.

A step 301 includes: receiving an operating request.

In other words, the number of operating requests received in the server of the step 201 is 1, which can be viewed as M=1.

A step 302 includes: obtaining an instruction stream of a target neural network model corresponding to the operating request.

The instruction stream indicates an operating order of the target neural network model and an instruction corresponding to each order, which is viewed as an instruction sequence. An operation of the target neural network model can be realized through the instruction stream. Each target neural network model corresponds to a basic operating sequence, that is, a data structure describing the operation of the target neural network model is obtained by parsing the target neural network model. A parsing rule between the basic operating sequence and an instruction descriptor is not limited herein. An instruction descriptor stream corresponding to the target neural network model is obtained according to the parsing rule between the basic operation sequence and the instruction descriptor.

A preset format of each instruction descriptor stream in the instruction descriptor stream is not limited in the present disclosure. An instruction corresponding to the instruction descriptor stream may be generated according to a network structure in a preset format. The instruction may include all instructions in the cambricon instruction set, such as matrix operating instructions, convolution operating instructions, fully connected layer forward operating instructions, pooling operating instructions, normalization instructions, vector operating instructions, and scalar operating instructions.

Optionally, the obtaining the instruction stream of the target neural network model corresponding to the operating request may include: obtaining a first instruction descriptor stream according to a basic operating sequence corresponding to the target neural network model; simplifying the first instruction descriptor stream to obtain a second instruction descriptor stream; and obtaining the instruction stream according to the second instruction descriptor stream.

In other words, by simplifying the first instruction descriptor stream, redundant instruction descriptors in the first instruction descriptor stream are eliminated, which can shorten the instruction stream. Then, an instruction stream that can be executed by the computing device is obtained according to the second instruction descriptor stream, and output data is obtained by operating an instruction and input data, which can avoid redundant input, output, or other operations generated during the operation of a complete neural network composed of fine-grained atomic operations such as convolution, pooling, and activation. Therefore, the server's operating speed may be further increased.

It should be noted that if an operating request corresponds to multiple target neural network models, instruction streams of the multiple target neural network models need to be obtained and then split to complete the operating request.

A step 303 includes: splitting the instruction stream into multiple parallel instructions and multiple serial instructions.

A method of splitting an instruction stream is not limited herein. The parallel instructions refer to instructions that can be allocated to multiple computing devices for simultaneous execution, while the serial instructions refer to instructions that can only be executed by a single computing device. For instance, operating requests such as video recognition and comprehension may generally include feature extraction instructions and feature recognition instructions. The feature extraction instructions are configured to perform convolution processing on several consecutive frames of images, and the feature recognition instructions are configured to perform a recurrent neural network operation on features obtained by the feature extraction instruction. The feature extraction instructions can be allocated to multiple computing devices, while the feature recognition instructions can only be processed by a single computing device.

A step 304 includes: selecting multiple parallel computing devices corresponding to the multiple parallel instructions and at least one serial computing device corresponding to the multiple serial instructions from multiple computing devices.

Multiple parallel instructions and multiple serial instructions may be obtained by splitting an instruction stream. A parallel computing device corresponding to each parallel instruction and a serial computing device corresponding to multiple serial instructions are selected from multiple computing devices included in the server to obtain multiple parallel computing devices and at least one serial computing device. In other words, at least one target computing device of the step 202 includes multiple parallel computing devices and at least one serial computing device. An operating instruction of each parallel computing device is a parallel instruction corresponding to the parallel computing device, and an operating instruction of each serial computing device is a corresponding serial instruction.

A method of selecting a serial computing device and a parallel computing device is not limited in the present disclosure.

Optionally, when the operating task is a training task, operating data corresponding to the operating request is grouped based on a training method corresponding to the training task to obtain multiple groups of operating data; the parallel instructions are selected according to the multiple groups of operating data and the multiple parallel computing devices from the multiple computing devices.

According to a specific training method, the operating data corresponding to the operating request is grouped to obtain multiple groups of operating data. The operating data may be grouped by data types, and may be divided into multiple groups, which are not limited herein. After the operating data is grouped, a proper computing device is selected for parallel operation, which further reduces the computing amount of each computing device, and improves operating efficiency.

For instance, for a batch gradient descent algorithm (BGD), there may be a training batch configured to divide a batch into multiple sub-batches and allocate the multiple sub-batches to multiple computing devices. Each computing device trains one sub-batch, and each sub-batch is a group of operating data. For a Stochastic Gradient Descent algorithm (SGD), there may be only one piece of operating data in each training batch, and different training batches can be allocated to different computing devices; for a mini-batch SGD algorithm, different data of each batch can be allocated to different computing devices, or each batch can be divided into smaller sub-batches and then allocated to different computing devices for computation.

In the present disclosure, a serial computing device may be one computing device or multiple computing devices among multiple parallel computing devices, or may be other idle computing devices and the like.

Optionally, if a computing characteristic gap between each two parts of a serial instruction is large, the selecting the at least one serial computing device corresponding to the multiple serial instructions from the multiple computing devices may include: grouping the multiple serial instructions to obtain at least one serial instruction sequence; and selecting a computing device corresponding to each group of the at least one group of serial instruction sequences from the multiple computing devices to obtain the at least one serial computing device.

Multiple serial instructions are grouped to obtain multiple groups of instruction sequences, and then the computing device corresponding to each group of instruction sequences is selected for operations. The corresponding instructions are executed by using the computing devices that are expert in processing to improve operating efficiency of each part, which can improve overall operating efficiency.

For instance, a faster region-based convolutional neural network (Faster R-CNN) is composed of a convolutional layer, a region proposal network (RPN) layer, and a region of interest pooling (ROI pooling) layer, and the computing characteristic gap between each two layers is large. Therefore, the convolutional layer and the RPN layer can be deployed on a neural network computing device that is expert in processing convolutions, while the ROI pooling layer can be deployed on a neural network computing device that is expert in processing convolutions [A1], such as a general-purpose processor CPU, to improve operating efficiency of each part, which can improve overall operating efficiency.

A step 305 includes: computing corresponding operating data of the operating request according to a parallel instruction corresponding to each of the multiple parallel computing devices and a serial instruction corresponding to each of the at least one serial computing device to obtain a final operating result.

A step 306 includes: sending the final operating result to an electronic device that sends the operating request.

In other words, when a single operating request sent by the electronic device is received by the server, an instruction stream of the target neural network model corresponding to the operating request is split, and a parallel computing device corresponding to the parallel instruction and a serial computing device corresponding to the serial instruction are selected. Then the serial computing device that is expert in processing a serial instruction is selected to separately execute a corresponding serial instruction, and a final operating result corresponding to the operating request is sent to an electronic device. In this case, a corresponding parallel instruction is executed in parallel by a computing device in the multiple parallel computing devices, which can save execution time of the parallel instruction. The computing efficiency between each serial instruction can also be improved by the serial computing device. To summarize, computing resources are allocated uniformly according to the operating request, so that multiple computing devices in the server can effectively cooperate to improve overall computing efficiency of the server.

Figure 4:
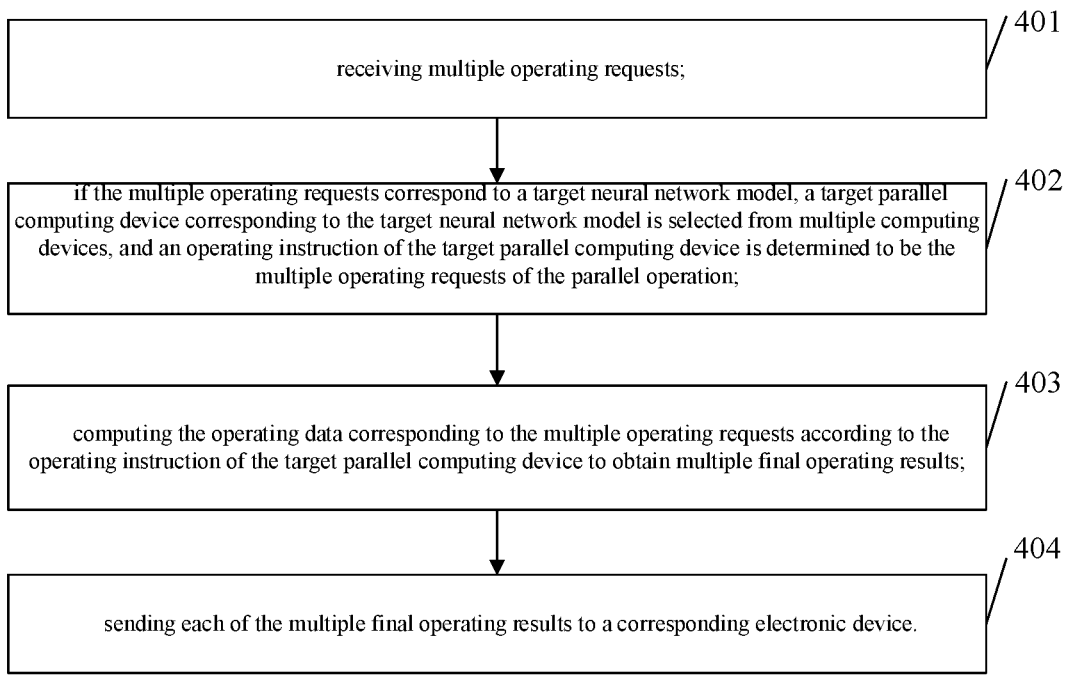
FIG. 4 is a flow chart of another scheduling method of one example of the present disclosure.

FIG. 4 is a flow chart of another scheduling method of one example of the present disclosure. As shown in FIG. 4, the method is applied to the server shown in FIG. 1, and an electronic device that allows access to the server is involved in the method.

A step 401 includes: receiving multiple operating requests.

In other words, the number of operating requests received in the server of the step 201 is greater than one, which can be viewed as M>1.

A step 402 includes: if the multiple operating requests correspond to a target neural network model, a target parallel computing device corresponding to the target neural network model is selected from multiple computing devices, and an operating instruction of the target parallel computing device is determined to be the multiple operating requests of the parallel operation.

In other words, if there are multiple operating requests and the multiple operating requests correspond to the same target neural network model, a target parallel computing device corresponding to the target neural network model can be selected from multiple computing devices, so as to facilitate the target parallel computing device to perform the parallel operation on the corresponding operating data of the multiple operating requests. Therefore, time waste caused by repeatedly using the target neural network model for operations may be avoided.

A step 403 includes: computing the operating data corresponding to the multiple operating requests according to the operating instruction of the target parallel computing device to obtain multiple final operating results.

A step 404 includes: sending each of the multiple final operating results to a corresponding electronic device.

It can be understood that if there are multiple operating requests in the server and the multiple operating requests are directed to the same target neural network model, a target parallel computing device corresponding to the target neural network model can be selected from multiple computing devices, and the target parallel computing device performs a batch operation on the operating data corresponding to multiple operating requests. Then the final operating results obtained by the operation are distinguished to obtain a final operating result corresponding to each operating request, and the final operating result corresponding to each operating request is send to the corresponding electronic device. Therefore, time waste caused by repeatedly using the target neural network model for operations may be avoided, which can improve the overall operating efficiency of the server.

Figure 5:
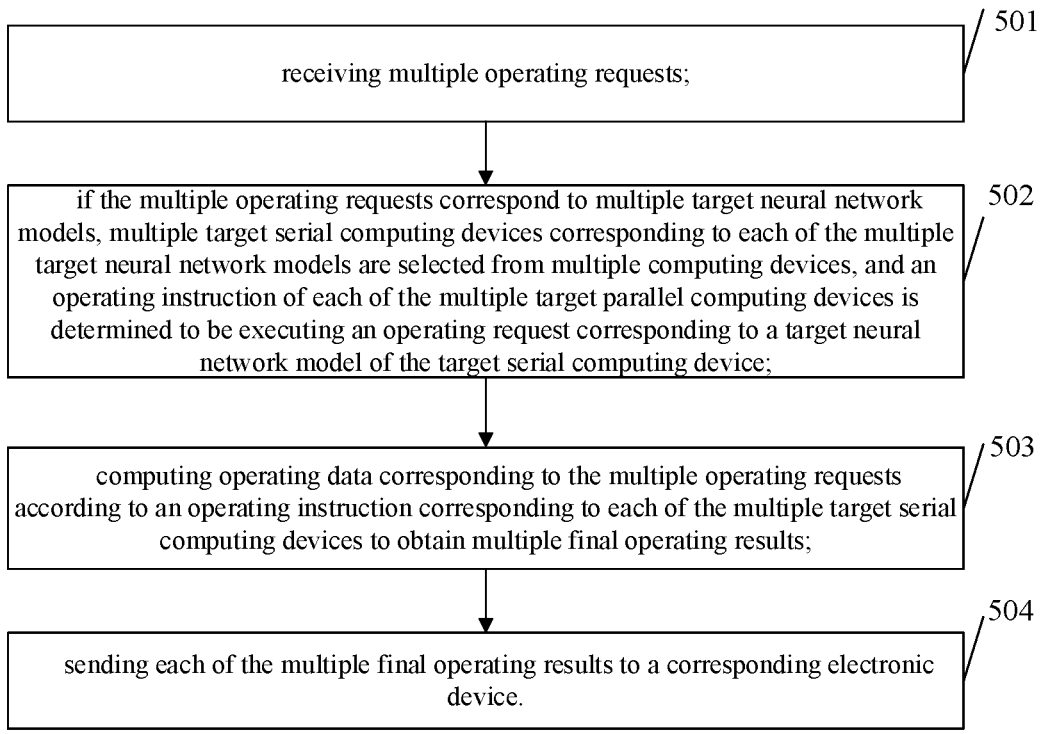
FIG. 5 is a flow chart of another scheduling method of one example of the present disclosure.

FIG. 5 is a flow chart of another scheduling method of one example of the present application. As shown in FIG. 5, the method is applied to the server shown in FIG. 1, and an electronic device that allows access to the server is involved in the method.

A step 501 includes: receiving multiple operating requests.

In other words, the number of operating requests received in the server of the step 201 is greater than one, which can be viewed as M>1.

A step 502 includes: if the multiple operating requests correspond to multiple target neural network models, multiple target serial computing devices corresponding to each of the multiple target neural network models are selected from multiple computing devices, and an operating instruction of each of the multiple target parallel computing devices is determined to be executing an operating request corresponding to a target neural network model of the target serial computing device.

In other words, if there are multiple operating requests and the multiple operating requests correspond to multiple target neural network models, target serial computing devices corresponding to the target neural network models can be selected from multiple computing devices respectively to improve operating efficiency of each operating request. In addition, the target serial computing devices are deployed with corresponding target neural network models, which can save time in network initialization and improve the operating efficiency.

A step 503 includes: computing operating data corresponding to the multiple operating requests according to an operating instruction corresponding to each of the multiple target serial computing devices to obtain multiple final operating results.

A step 504 includes: sending each of the multiple final operating results to a corresponding electronic device.

It can be understood that if there are multiple operating requests in the server and the multiple operating requests correspond to multiple target neural network models, target serial computing devices corresponding to the target neural network models can be selected from the multiple computing devices respectively. The serial computing devices execute corresponding operating requests separately, which can improve the operating efficiency of each operating request. In addition, the target serial computing devices are deployed with corresponding target neural network models, which can save time in network initialization and improve the operating efficiency.

Optionally, an auxiliary scheduling algorithm may be selected from a set of auxiliary scheduling algorithms according to attribute information of each of the M operating requests; the at least one target computing device may be selected from the multiple computing devices according to the auxiliary scheduling algorithm, and an operating instruction corresponding to each of the at least one target computing device may be determined.

The set of auxiliary scheduling algorithms includes, but is not limited to, one of the following: a Round-Robin Scheduling algorithm, a Weighted Round Robin algorithm, a Least Connections algorithm, a Weighted Least Connections Algorithm, a Locality-Based Least Connections algorithm, a Locality-Based Least Connections with Replication algorithm, a Destination Hashing algorithm, and a Source Hashing algorithm.

A method of selecting an auxiliary scheduling algorithm according to the attribute information is not limited in the present disclosure. For instance, if multiple target computing devices process the same type of operating request, the auxiliary scheduling algorithm can be the Round-Robin Scheduling algorithm; if different target computing devices have different compressive strength, more operating requests should be allocated to target computing devices with high configuration and low load, and the auxiliary scheduling algorithm can be the Weighted Round Robin algorithm; and if different workloads are allocated to each of the multiple target computing devices, the auxiliary scheduling algorithm can be the Least Connections scheduling algorithm used for dynamically selecting a target computing device with a least number of backlog connections to process a current request, so as to improve utilization efficiency of the target computing device, or the auxiliary scheduling algorithm can be the Weighted Least Connections scheduling algorithm.

In other words, on the basis of scheduling methods described in the examples as shown in FIG. 2, FIG. 3, FIG. 4, or FIG. 5, a computing device that finally executes an operating request is selected combined with the auxiliary scheduling algorithm, so as to further improve operating efficiency of the server.

Figure 6:
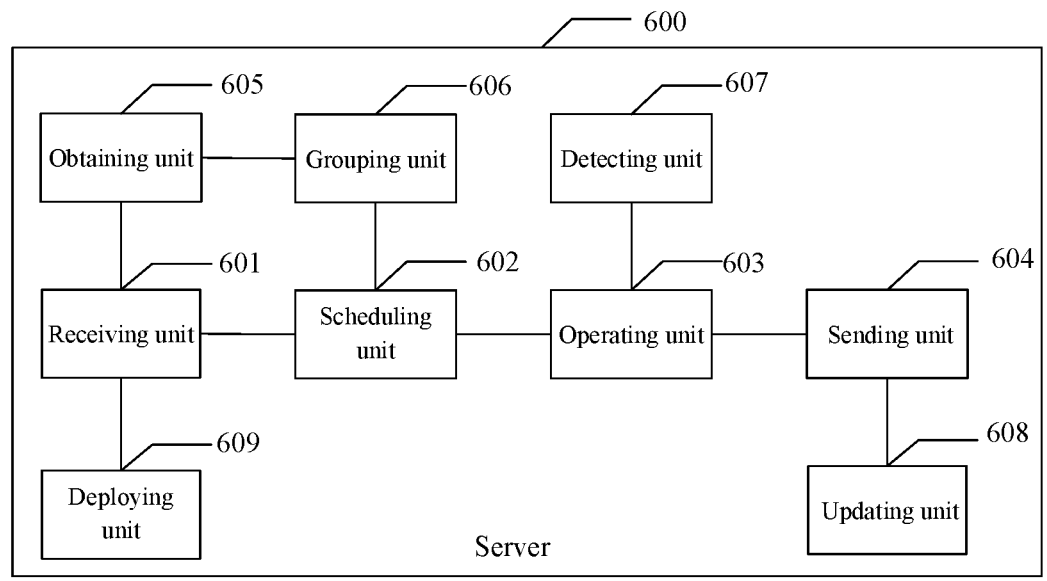
FIG. 6 is a structural diagram of another server according to one example of the present disclosure.

Consistent with the examples as shown in FIG. 2, FIG. 3, FIG. 4, or FIG. 5, FIG. 6 is a structural diagram of another server according to one example of the present disclosure. The server includes multiple computing devices. As shown in FIG. 6, a server 600 includes:

a receiving unit 601 configured to receive M operating requests, where M is a positive integer;

a scheduling unit 602 configured to select at least one target computing device from multiple computing devices according to attribute information of each of the M operating requests, and determine an operating instruction corresponding to each of the at least one target computing device;

an operating unit 603 configured to compute operating data corresponding to the M operating requests according to the operating instruction corresponding to each of the at least one target computing device to obtain M final operating results; and a sending unit 604 configured to send each of the M final operating results to a corresponding electronic device.

Optionally, the attribute information includes a target neural network model, and the at least one target computing device includes multiple parallel computing devices and at least one serial computing device. The server 600 further includes:

an obtaining unit 605 configured to, if M=1, obtain an instruction stream of a target neural network model corresponding to the operating request;

a grouping unit 606 configured to split the instruction stream into multiple parallel instructions and multiple serial instructions; and the scheduling unit 602 selects the multiple parallel computing devices corresponding to the multiple parallel instructions and the at least one serial computing device corresponding to the multiple serial instructions from the multiple computing devices, determines an operating instruction of each of the multiple parallel computing devices to be a corresponding parallel instruction, and determines an operating instruction of each of the at least one serial computing device to be a corresponding serial instruction.

Optionally, the obtaining unit 605 is specifically configured to obtain a first instruction descriptor stream according to a basic operation sequence corresponding to the target neural network model; simplify the first instruction descriptor stream to obtain a second instruction descriptor stream; and obtain the instruction stream according to the second instruction descriptor stream.

Optionally, the grouping unit 606 is specifically configured to group the multiple serial instructions to obtain at least one group of serial instruction sequences; and the scheduling unit 602 is specifically configured to select a computing device corresponding to each group of the at least one group of serial instruction sequences from the multiple computing device to obtain the at least one serial computing device.

Optionally, the grouping unit 606 is specifically configured to, if the operating request is a training task, group the operating data corresponding to the operating request based on a training method corresponding to the operating request to obtain multiple groups of operating data; and the scheduling unit 602 is specifically configured to select the multiple parallel computing devices from the multiple computing devices according to the multiple groups of operating data and the multiple parallel instructions.

Optionally, the attribute information includes a target neural network model, and the at least one target computing device is a target parallel computing device. The scheduling unit 602 is specifically configured to, if M is greater than 1 and the M operating requests correspond to one target neural network model, select the target parallel computing device corresponding to the target neural network model from the multiple computing devices, and determine an operating instruction of the target parallel computing device to be performing a parallel operation on the M operating requests.

Optionally, the attribute information includes a target neural network model, and the at least one target computing device includes multiple target serial computing devices. The scheduling unit 602 is specifically configured to, if M is greater than 1 and the M operating requests correspond to multiple target neural network models, select the multiple target serial computing devices corresponding to each of the multiple target neural network models from the multiple computing devices, and determine an operating instruction corresponding to each of the target serial computing devices to be executing an operating request corresponding to the target neural network model of the target serial computing device.

Optionally, the attribute information includes an operating task. If the operating task of a target operating task is a test task, the scheduling unit 602 is specifically configured to select a computing device for forward operation of a target network model corresponding to the target operating task from the multiple computing devices to obtain a target computing device. The target operating request is any one of the M operating requests, and the first target computing device is a target computing device corresponding to the target operating request in the at least one target computing device. If the operating task of the target operating request is a training task, the scheduling unit 602 is specifically configured to select a computing device for the forward operation and reverse training of the target neural network model corresponding to the target operating task from the multiple computing devices to obtain the first target computing device; and determine an operating instruction corresponding to the first target computing device to be completing the target operating request.

Optionally, the scheduling unit 602 is specifically configured to select an auxiliary scheduling algorithm from a set of auxiliary scheduling algorithms according to attribute information of each of the M operating requests. The set of auxiliary scheduling algorithms includes at least one of the following: a Round-Robin Scheduling algorithm, a Weighted Round Robin algorithm, a Least Connections algorithm, a Weighted Least Connections Algorithm, a Locality-Based Least Connections algorithm, a Locality-Based Least Connections with Replication algorithm, a Destination Hashing algorithm, and a Source Hashing algorithm. The at least one target computing device may be selected from the multiple computing devices according to the auxiliary scheduling algorithm, and an operating instruction corresponding to each of the at least one target computing device may be determined.

Optionally, the server further includes a detecting unit 607 configured to wait for a first preset time period and detect whether each of the at least one target computing device returns a final computing result of a corresponding operating instruction. if each of the at least one target computing device does not return a final operating result of a corresponding operating instruction, the target computing device that does not return the final operating result is viewed as a delay computing device. The scheduling unit 602 is configured to select an alternative computing device from idle computing devices of the multiple computing devices according to a corresponding operating instruction of the delay computing device; and the operating unit 603 is configured to execute the corresponding operating instruction of the delay computing device by using the alternative computing device.

Optionally, the obtaining unit 605 is further configured to obtain a final operating result returned first between the delay computing device and the alternative computing device; and the sending unit 604 is configured to send a pause instruction to a computing device that does not return a final computing result between the delay computing device and the alternative computing device.

Optionally, the detecting unit 607 is further configured to wait for a second preset time period, and detect whether the delay computing device returns a final operating result of a corresponding operating instruction. If the delay computing device does not return a final operating result of a corresponding operating instruction, the delay computing device that does not return a final operating result is viewed as a fault computing device. The sending unit 604 is further configured to send a fault instruction to inform an operations engineer that a fault occurs in the fault computing device, and the second preset time period is greater than the first preset time period Optionally, the server further includes an updating unit 608 configured to update hash tables of the server every target time threshold.

Optionally, the obtaining unit 605 is further configured to obtain an operating request of each neural network model in a set of specified neural network models and a hardware attribute of each computing device in the multiple computing devices to obtain multiple operating requests and multiple hardware attributes.

The server further includes a deploying unit 609 configured to deploy a corresponding specified neural network model on a specified computing device corresponding to each neural network model in the set of specified neural network models according to the multiple operating requests and the multiple hardware attributes.

Optionally, the computing device includes at least one computing carrier, and the computing carrier includes at least one computing unit.

It can be understood that, based on attribute information of the received M operating requests, a target computing device configured to execute M operating requests may be selected from the multiple computing devices included in the server, and an operating instruction corresponding to the target computing device may be determined. The target computing device completes the operating request according to a corresponding operating instruction of the target computing device, and sends the final operating result corresponding to each operating request to the corresponding electronic device. In other words, computing resources are uniformly allocated according to the operating request, so that multiple computing devices in the server can effectively cooperate to improve the operating efficiency of the server.

Figure 7:
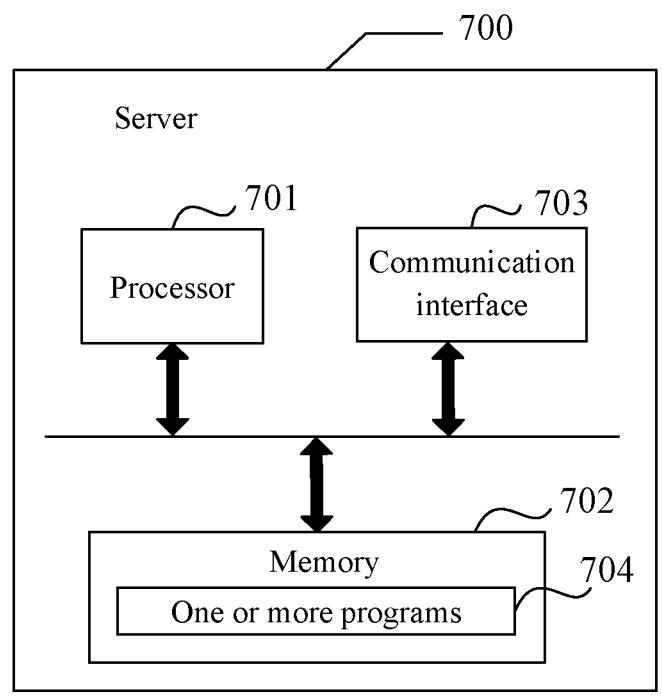
FIG. 7 is a structural diagram of another server according to one example of the present disclosure.

In an example, as shown in FIG. 7, the present disclosure provides another server 700, which includes a processor 701, a memory 702, a communication interface 703, and one or more programs 704. The one or more programs 704 are stored in the memory 702, and are configured to be executed by the processor. The program 704 includes instructions used for performing part or all of the steps described in the above scheduling method.

Another example of the present disclosure provides a computer readable storage medium, on which a computer program is stored. The computer program includes a program instruction. When executed by the processor, the program instruction enables the processor to execute implementations described in the scheduling method.

Those of ordinary skill in the art may realize that the units and algorithm steps described in the examples disclosed in the present disclosure can be implemented by electronic hardware, computer software, or a combination of the electronic hardware and the computer software. In order to clearly illustrate interchangeability between the hardware and the software, the composition and steps of each example have been described generally in terms of functions in the above descriptions. Whether these functions are executed in a manner of hardware or software depends on specific applications and design constraints of the technical solution. Those of ordinary skill in the art can implement the described functions for each specific application by using different methods, but such implementation should shall fall within the protection scope of the present disclosure.

Those skilled in the art may clearly understand that for convenience and brevity of descriptions, specific working processes of terminals and units described above will not be further described here. For details, please refer to the corresponding processes in the above method examples.

In some examples of the disclosure, it should be understood that the terminals and units disclosed may be implemented in other manners. For instance, the described device examples are merely illustrative. For instance, division of the units is only a logical function division and can be divided in other manners during actual implementations; or multiple units or components may be combined or integrated into another system, or some features may be ignored, or not performed. In addition, coupling or direct coupling or communication connection between each illustrated or discussed component may be indirect coupling or communication connection through some interfaces, devices, or units, and may be electrical connection, mechanical connection, or other forms of connection.

The units described as separate components may or may not be physically separated and the components illustrated as units may or may not be physical units, that is, the units or the components may be in the same place or may be distributed to multiple network units. All or part of the units may be selected according to actual needs to achieve the purpose of the technical solutions of the examples.

In addition, functional units in various examples of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various examples of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It should be noted that implementations which are not illustrated or described in the drawings or the specification are all forms known to those of ordinary skill in the art and are not described in detail. In addition, the above descriptions about each component are not limited to various specific structures and shapes mentioned in the examples. Those of ordinary skill in the art may make simple modifications or replacements.

Purposes, technical solutions and beneficial effects of the disclosure are further described above with the specific examples in detail. It should be understood that the above is only the specific example of the disclosure and not intended to limit the disclosure. Any modifications, equivalent replacements, improvements and the like made within the spirit and principle of the disclosure shall fall within the scope of protection of the disclosure.

What is claimed:

1. A scheduling method based on a server which includes multiple computing devices, comprising:
receiving one or more operating requests;
selecting at least one target computing device from the multiple computing devices according to attribute information of each of the one or more operating requests, and determining an operating instruction corresponding to each of the at least one target computing device;
computing operating data corresponding to the one or more operating requests according to the operating instruction corresponding to each of the at least one target computing device to obtain one or more final operating results, wherein a count of the operating requests is equal to a count of the final operating results; and
sending each of the one or more final operating results to a corresponding electronic device,
wherein the attribute information includes a target neural network model, the at least one target computing device includes multiple parallel computing devices and at least one serial computing device, and the selecting at least one target computing device from the multiple computing devices according to attribute information of each of the one or more operating requests, and determining an operating instruction corresponding to each of the at least one target computing device include:
based on a determination that the count of the one or more operating requests is 1, obtaining an instruction stream of a target neural network model corresponding to the operating request,
splitting the instruction stream into multiple parallel instructions and multiple serial instructions,
selecting the multiple parallel computing devices corresponding to the multiple parallel instructions and the at least one serial computing device corresponding to the multiple serial instructions from the multiple computing devices, and determining an operating instruction of each of the parallel computing devices to be a corresponding parallel instruction, and determining an operating instruction of each of the at least one serial computing device to be a corresponding serial instruction.

2. The method of claim 1, wherein the obtaining the instruction stream of the target neural network model corresponding to the operating request includes:
obtaining a first instruction descriptor stream according to a basic operation sequence corresponding to the target neural network model,
simplifying the first instruction descriptor stream to obtain a second instruction descriptor stream, and obtaining the instruction stream according to the second instruction descriptor stream.

3. The method of claim 1, wherein the selecting the at least one serial computing device corresponding to the multiple serial instructions from the multiple computing devices includes:
grouping the multiple serial instructions to obtain at least one group of serial instruction sequences, and
selecting a computing device corresponding to each group of the at least one group of serial instruction sequences from the multiple computing devices to obtain the at least one serial computing device.

4. The method of claim 1, wherein the selecting the multiple parallel computing devices corresponding to the multiple parallel instructions from the multiple computing devices include:
grouping, if one of the one or more operating requests is a training task, operating data corresponding to the operating request based on a training method corresponding to the operating request to obtain multiple groups of operating data, and
selecting the multiple parallel computing devices from the multiple computing devices according to the multiple groups of operating data and the multiple parallel instructions.

5. The method of claim 1, wherein the attribute information includes a target neural network model, the at least one target computing device is a target parallel computing device, and the selecting at least one target computing device from the multiple computing devices according to the attribute information of each of the one or more operating requests and determining an operating instruction corresponding to each of the at least one target computing device include:
selecting, based on a determination that the count of the operating requests is greater than 1 and the one or more operating requests correspond to one target neural network model, the target parallel computing device corresponding to the target neural network model from the multiple computing devices, and determining the operating instruction of the target parallel computing device to be performing a parallel operation on the one or more operating requests.

6. The method of claim 1, wherein the attribute information includes a target neural network model, the at least one target computing device includes multiple target serial computing devices, and the selecting at least one computing device from the multiple computing devices according to attribute information of each of the one or more operating requests and determining an operating instruction corresponding to each of the at least one target computing device include:
selecting, based on a determination that the count of the operating requests is greater than 1 and the one or more operating requests correspond to multiple target neural network models, the multiple target serial computing devices corresponding to each of the multiple target neural network models from the multiple computing devices, and determining the operating instruction corresponding to each of the multiple target serial computing devices to be executing an operating request corresponding to the target neural network model of the target serial computing device.

7. The method of claim 1, wherein the attribute information includes an operating task, and the selecting at least one target computing device from the multiple computing devices according to the attribute information of each of the one or more operating requests and determining an operating instruction corresponding to each of the at least one target computing device include:
selecting, based on a determination that an operating task of a target operating request is a test task, a computing device for forward operation of a target neural network model corresponding to the target operating task from the multiple computing devices to obtain a first target computing device, wherein the target operating request is any one of the one or more operating requests, and the first target computing device is a target computing device corresponding to the target operating request in the at least one target computing device, and
selecting, based on a determination that an operating task of the target operating task is a training task, a computing device for forward computing and reverse training of a target neural network model corresponding to the target operating task from the multiple computing devices to obtain the first target computing device, and
determining an operating instruction corresponding to the first target computing device to be completing the target operating request.

8. The method of claim 1, wherein the selecting at least one target computing device from the multiple computing devices according to the attribute information of each of the one or more operating requests and determining the operating instruction corresponding to each of the at least one target computing device include:
selecting an auxiliary scheduling algorithm from a set of auxiliary scheduling algorithms according to the attribute information of each of the one or more operating requests, wherein the set of auxiliary scheduling algorithms includes at least one of the following: a Round-Robin Scheduling algorithm, a Weighted Round Robin algorithm, a Least Connections algorithm, a Weighted Least Connections Algorithm, a Locality-Based Least Connections algorithm, a Locality-Based Least Connections with Replication algorithm, a Destination Hashing algorithm, and a Source Hashing algorithm, and
selecting the at least one target computing device from the multiple computing devices according to the auxiliary scheduling algorithm, and determining an operating instruction corresponding to each of the at least one target computing device.

9. The method of claim 1, further comprising:
waiting for a first preset time period, and detecting whether each of the at least one target computing device returns a final operating result of a corresponding operating instruction, wherein based on a determination that each of the at least one target computing device does not return a final operating result of a corresponding operating instruction, the target computing device that does not return the final operating result is viewed as a delay computing device,
selecting an alternative computing device from idle computing devices of the multiple computing devices according to a corresponding operating instruction of the delay computing device, and
executing the corresponding operating instruction of the delay computing device by using the alternative computing device.

10. The method of claim 9, wherein after the executing the corresponding operating instruction of the delay computing device by using the alternative computing device, the method further includes:

obtaining a final operating result returned first between the delay computing device and the alternative computing device, and sending a pause instruction to a computing device that does not return a final operating result between the delayed computing device and the alternative computing device.

11. The method of claim 9, further comprising:

waiting for a second preset time period, and detecting whether the delay computing device returns a final operating result of a corresponding operating instruction, wherein based on a determination that the delay computing device does not return a final operating result of a corresponding operating instruction, the delay computing device that does not return a final operating result is viewed as a fault computing device, and then a fault instruction is sent to inform an operations engineer that a fault occurs in the fault computing device, and the second preset time period is greater than the first preset time period.

12. The method of claim 1, further comprising:

updating hash tables of the server every target time threshold.

13. The method of claim 1, further comprising:

obtaining an operating request of each neural network model in a set of specified neural network models and a hardware attribute of each computing device in the multiple computing devices to obtain multiple operating requests and multiple hardware attributes, and deploying a corresponding specified neural network model on a specified computing device corresponding to each neural network model in the set of specified neural network models according to the multiple operating requests and the multiple hardware attributes.

14. The method of claim 1, wherein the computing device includes at least one computing carrier, and the computing carrier includes at least one computing unit.

* * * * *